United States Patent
Nunami et al.

(10) Patent No.: US 9,038,164 B2
(45) Date of Patent: May 19, 2015

(54) ELECTRONIC DEVICE, ELECTRONIC DEVICE CONTROLLING METHOD, AND COMPUTER PROGRAM PRODUCT

(71) Applicants: Tsukasa Nunami, Ome (JP); Hideaki Andou, Ome (JP); Yuuji Irimoto, Fussa (JP); Ryuhei Yokota, Tachikawa (JP)

(72) Inventors: Tsukasa Nunami, Ome (JP); Hideaki Andou, Ome (JP); Yuuji Irimoto, Fussa (JP); Ryuhei Yokota, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 50 days.

(21) Appl. No.: 13/681,221

(22) Filed: Nov. 19, 2012

(65) Prior Publication Data
US 2013/0232568 A1    Sep. 5, 2013

(30) Foreign Application Priority Data

Mar. 2, 2012    (JP) .................................. 2012-047346

(51) Int. Cl.
G06F 7/04         (2006.01)
G06F 21/00        (2013.01)
G06F 21/32        (2013.01)

(52) U.S. Cl.
CPC ........ *G06F 21/32* (2013.01); *G06F 2221/2139* (2013.01)

(58) Field of Classification Search
CPC ................ G06F 21/31; G06F 21/6218; G06F 2221/2141; G06F 2221/2113; G06F 21/10; G06F 21/32; G06F 21/00; H04N 7/147
USPC ........ 726/17, 18; 713/118, 186, 182; 715/741
See application file for complete search history.

(56) References Cited

U.S. PATENT DOCUMENTS

| | | | |
|---|---|---|---|
| 8,261,090 B1* | 9/2012 | Matsuoka | 713/186 |
| 8,630,623 B2* | 1/2014 | Park et al. | 455/411 |
| 8,654,091 B2* | 2/2014 | Kim et al. | 345/173 |
| 8,811,948 B2* | 8/2014 | Bandyopadhyay et al. | 455/411 |
| 2005/0079896 A1* | 4/2005 | Kokko et al. | 455/566 |
| 2007/0086626 A1* | 4/2007 | Mariani et al. | 382/115 |
| 2007/0105072 A1* | 5/2007 | Koljonen | 434/112 |

(Continued)

FOREIGN PATENT DOCUMENTS

| | | |
|---|---|---|
| JP | 2003-141088 | 5/2003 |
| JP | 2005-115480 | 4/2005 |

(Continued)

OTHER PUBLICATIONS

Japanese Office Action for Application No. 2012-047346 mailed Feb. 12, 2013.

*Primary Examiner* — Abu Sholeman
(74) *Attorney, Agent, or Firm* — Blakely Sokoloff Taylor & Zafman LLP

(57) ABSTRACT

An electronic device includes: display controller; user presence determination module; user authentication module; and controller. The user presence determination module determines presence of a user based on image data received from the camera while dominating access to a camera. The user authentication module dominates access to the camera, if the display is put in a screen lock state and to perform a user authentication based on the image data. The controller turns off the display if the user present determination module determines that the user is absent and while the display has not been put in the screen lock state, and to cause the user presence determination module to release the access to the camera and to put the display in the screen lock state before turning on the display if it is determined after the display is turned off that the user is present.

6 Claims, 7 Drawing Sheets

(56) References Cited

U.S. PATENT DOCUMENTS

| | | | |
|---|---|---|---|
| 2007/0245155 A1* | 10/2007 | Mimura et al. | 713/186 |
| 2009/0220128 A1* | 9/2009 | Irimoto et al. | 382/118 |
| 2009/0258667 A1* | 10/2009 | Suzuki et al. | 455/550.1 |
| 2010/0107242 A1* | 4/2010 | Ohta | 726/19 |
| 2010/0118848 A1* | 5/2010 | Satou | 370/338 |
| 2010/0157088 A1* | 6/2010 | Irimoto | 348/222.1 |
| 2011/0016319 A1* | 1/2011 | Lundberg et al. | 713/170 |
| 2011/0047341 A1* | 2/2011 | Yu et al. | 711/162 |
| 2011/0115877 A1* | 5/2011 | Kang | 348/14.12 |
| 2011/0246694 A1 | 10/2011 | Ichinose | |
| 2012/0009896 A1* | 1/2012 | Bandyopadhyay et al. | 455/411 |
| 2012/0084691 A1* | 4/2012 | Yun | 715/769 |
| 2012/0284789 A1* | 11/2012 | Kim et al. | 726/19 |
| 2012/0302167 A1* | 11/2012 | Yun et al. | 455/41.2 |
| 2013/0069962 A1* | 3/2013 | Nealer et al. | 345/522 |
| 2013/0160109 A1* | 6/2013 | Klinghult | 726/19 |
| 2013/0191910 A1* | 7/2013 | Dellinger et al. | 726/19 |
| 2013/0223696 A1* | 8/2013 | Azar et al. | 382/118 |
| 2013/0232568 A1* | 9/2013 | Nunami et al. | 726/17 |
| 2013/0300652 A1* | 11/2013 | Raffle et al. | 345/156 |
| 2013/0342487 A1* | 12/2013 | Jeon et al. | 345/173 |
| 2014/0066131 A1* | 3/2014 | Yoo | 455/566 |
| 2014/0282877 A1* | 9/2014 | Mahaffey et al. | 726/3 |
| 2014/0333831 A1* | 11/2014 | Oh et al. | 348/376 |

FOREIGN PATENT DOCUMENTS

| | | |
|---|---|---|
| JP | 2007-097027 | 4/2007 |
| JP | 2010-140290 | 6/2010 |
| JP | 2010-145765 | 7/2010 |
| JP | 2011-061300 | 3/2011 |

* cited by examiner

FIG.3A

| POWER PLAN SETTING | SETTING (TIME) | |
|---|---|---|
| POWER PLAN SETTING TDIM FOR DISPLAY BRIGHTNESS REDUCTION MODE | 2 MINUTES | (= TMIN) |
| POWER PLAN SETTING TOFF FOR DISPLAY POWER-OFF MODE | 10 MINUTES | |
| POWER PLAN SETTING TSLP FOR INFORMATION PROCESSOR SLEEP MODE | 20 MINUTES | |
| POWER PLAN SETTING TSTP FOR INFORMATION PROCESSOR HIBERNATION MODE | 30 MINUTES | |

FIG.3B

| POWER PLAN SETTING | SETTING (TIME) | |
|---|---|---|
| POWER PLAN SETTING TDIM FOR BRIGHTNESS REDUCTION MODE | NONE | |
| POWER PLAN SETTING TOFF FOR DISPLAY POWER-OFF MODE | NONE | |
| POWER PLAN SETTING TSLP FOR INFORMATION PROCESSOR SLEEP MODE | 25 MINUTES | (= TMIN) |
| POWER PLAN SETTING TSTP FOR INFORMATION PROCESSOR HIBERNATION MODE | 50 MINUTES | |

TMIN ≤ 1 min: TINT = 45 sec 1 min < TMIN ≤ 20 min: TINT = TMIN/2

20 min ≤ TMIN: TINT = 10 min

ELECTRONIC DEVICE, ELECTRONIC DEVICE CONTROLLING METHOD, AND COMPUTER PROGRAM PRODUCT

CROSS-REFERENCE TO RELATED APPLICATIONS

This application is based upon and claims the benefit of priority from Japanese Patent Application No. 2012-047346, filed on Mar. 2, 2012, the entire contents of which are incorporated herein by reference.

FIELD

Embodiments described herein relate generally to an electronic device, an electronic device controlling method, and a computer program product.

BACKGROUND

Conventionally, there is known a power saving technology for display devices such as televisions and displays, by detecting a condition that the user has not been using the display and by shutting down a display.

For example, the power saving is achieved by turning off the television in accordance with a detection state of a user's face captured by a capturing module, thereby preventing the television from displaying images while there are no viewers around.

Further, there is disclosed a technology of detecting a user who is not seated on a predetermined seat by capturing its image with a camera, thereby stopping to display images on the display screen.

When only one camera device is used to perform detection of user presence and user authentication, and when the display is turned on or off in accordance with the user presence, it might be considered to provide a screen lock function which works in association with turning on and off of the display, in order to improve security.

However, if the user presence detection process and the user authentication process are performed independently, because access to the camera is exclusive, contention might occur in use of the camera device, and might result in a deadlock depending on some conditions.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

FIG. 3A is an exemplary schematic diagram for explaining power plan settings in the embodiment;

FIG. 3B is an exemplary schematic diagram for explaining other power plan settings in the embodiment;

DETAILED DESCRIPTION

In general, according to one embodiment, an electronic device comprises: a display; a user presence determination module; a user authentication module; and a controller. The display controller is configured to display various types of information on a display. The user presence determination module is configured to determine presence of a user based on image data received from the camera, while dominating access to a camera. The user authentication module is configured to dominate access to the camera, if the display is put in a screen lock state and to perform a user authentication based on the image data received from the camera. The controller is configured turn off the display if the user presence determination module determines that the user is absent and while the display has not been put in the screen lock state, and to cause the user presence determination module to release the access to the camera and to put the display in the screen lock state before turning on the display if it is determined after the display is turned off that the user is present.

An embodiment will now be explained in detail with reference to accompanying drawings.

Figure 1:
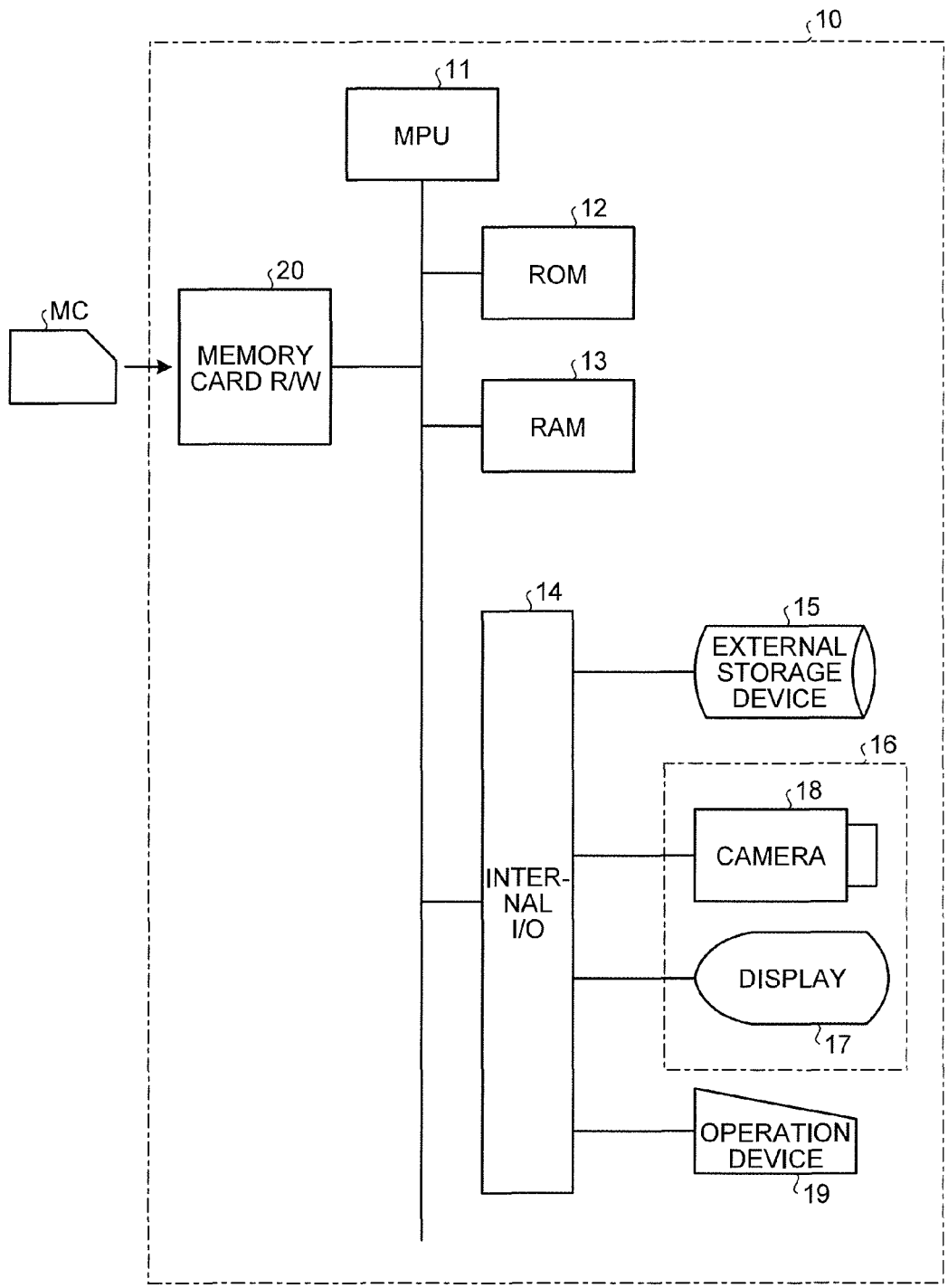
FIG. 1 is an exemplary block diagram of a configuration of an information processor, which is an electronic device, according to an embodiment.

FIG. 1 is a block diagram of an outlined configuration of an information processor, which is an electronic device, according to the embodiment.

An information processor 10 according to the first embodiment is configured as a laptop personal computer (PC) having a camera.

The information processor 10 comprises a micro-processing unit (MPU) 11 that controls the overall information processor 10, a read-only memory (ROM) 12 being a non-volatile memory storing therein control programs and the like executed by the MPU 11, a random access memory (RAM) 13 that is used as a working area of the MPU 11 and temporarily stores therein various types of data, an internal input/output (I/O) (I/O module) 14 performing various interfacing operations, and an external storage device 15 configured as a hard disk drive, a solid state disk (SSD), or the like connected via the internal I/O 14 and storing therein various types of data.

The information processor 10 comprises a display 17 configured as a liquid crystal display, an electroluminescent (EL) display, or the like housed in a display panel module 16, a camera 18 being a camera device including charge coupled device (CCD) imaging elements or complementary metal oxide semiconductor (CMOS) imaging elements, an operation device 19 configured as a keyboard, a touch panel, a mouse, and the like and allowing a user to perform various operations, and a memory card reader-writer (R/W) 20 into which a memory card MC that is a recording medium is inserted and that reads and writes various types of data.

Operations according to the embodiment will now be explained.

Figure 2:
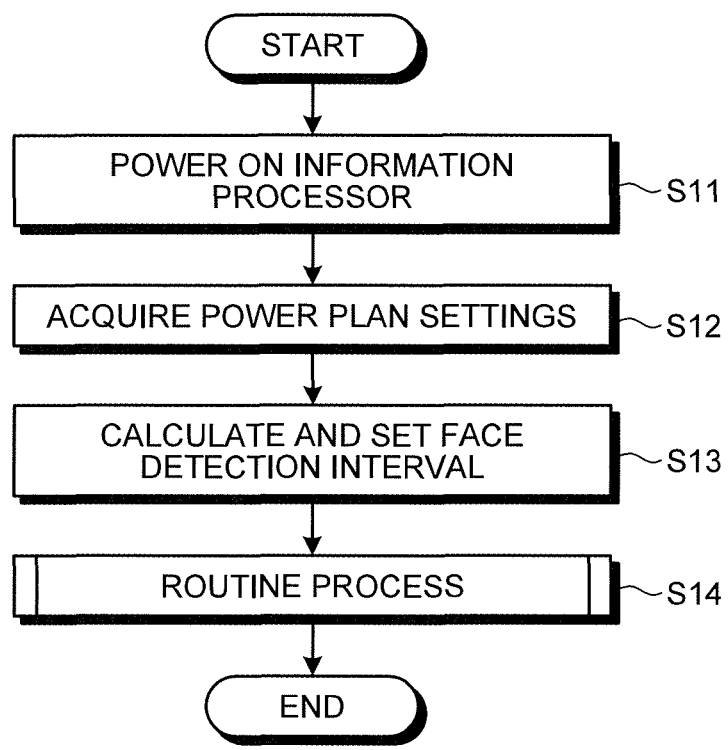
FIG. 2 is an exemplary flowchart of operations of the information processor in the embodiment.

FIG. 2 is a flowchart of outlined operations of the information processor 10 according to the embodiment.

It is assumed herein that, as an initial condition, the camera 18 is powered off, and the display is powered on.

To begin with, when the information processor 10 is powered on (S11), the MPU 11 refers to power plan setting data of an operating system (OS), and acquires power plan settings (S12).

The power plan setting is specified as a continuous time period during which a user perform no operation, from when a state in which the user perform no operation is detected in the information processor 10 to when a transition is made to a predetermined power saving mode.

The following four types of the power saving modes are available in the embodiment.

(1) Display brightness reduction mode
(2) Display power-off mode
(3) Information processor (computer) sleep mode
(4) Information processor (computer) hibernation mode The display brightness reduction mode saves power by reducing the amount of light output from backlights when the display is a backlight liquid crystal display.

The display power-off mode powers off the display, so that only a standby power is consumed. It goes without saying that, if the display is a backlight liquid crystal display, all of the backlights are turned off.

The information processor sleep mode is a state corresponding to the sleep state S3 according to the Advanced Configuration and Power Interface (ACPI) Specification, which is one of the standards related to power savings of personal computers. This is a power saving mode that suppresses power consumption by powering off devices such as a display function, an external storage device, and the like. In the sleep mode, because power is kept supplied to the RAM so that data currently being processed is maintained as it is, the information processor 10 can be resumed from where the work is stopped, unlike when the information processor is powered off and then powered on. In addition, a normal operation mode can be quickly recovered, e.g., within a few seconds, from the information processor sleep mode.

The information processor hibernation mode is a state corresponding to the sleep state S4 according to the ACPI Specification. This is a mode that saves the content of the RAM 13 in the external storage device 15, such as a hard disk drive, and then powering off the devices including the RAM 13. Therefore, an area for saving the data before making a transition to the hibernation is reserved in the storage area of the external storage device 15, in the memory capacity almost the same as the RAM 13. In the information processor hibernation mode, the information processor 10 is put in a state substantially the same as that of when the information processor 10 is powered off, unlike in the information processor sleep mode.

However, because the information processor 10 is required to save or to read the content of the RAM 13 in or from the external storage device 15, it takes time to make a transition to or recover from the information processor hibernation mode.

From the viewpoint of the device, the information processor 10 in both the information processor sleep mode and the information processor hibernation mode is in a state almost the same as that of when the information processor 10 is powered off. Therefore, in order to make transition to each mode, devices and device drivers needs to be completed and initialized as similar to the shutdown and system boot up (power on) for recovery.

FIGS. 3A and 3B are schematic diagrams for explaining an example of the power plan settings.

There are four types of power plan settings according to the embodiment, as illustrated in FIGS. 3A and 3B, in a manner corresponding to the power saving modes explained above. These types include a power plan setting TDIM corresponding to the display brightness reduction mode, a power plan setting TOFF corresponding to the display power-off mode, a power plan setting TSLP corresponding to the information processor (computer) sleep mode, and a power plan setting TSTP corresponding to the information processor (computer) hibernation mode.

The power plan setting is set to an OS timer managed by the MPU 11 mainly under the control of the OS. When the time specified in the power plan setting has elapsed from the time when a user stops making any operation, the operation mode is changed to a corresponding power saving mode. In the explanation below, the power plan settings are set in unit of a minute.

In the specific example of the power plan settings illustrated in FIG. 3A, the power plan setting TDIM corresponding to the display brightness reduction mode is set to 2 minutes, the power plan setting TOFF corresponding to the display power-off mode is set to 10 minutes, the power plan setting TSLP corresponding to the information processor sleep mode is set to 20 minutes, and the power plan setting TSTP corresponding to the information processor hibernation mode is set to 30 minutes.

In another example illustrated in FIG. 3B, the power plan setting TDIM corresponding to the display brightness reduction mode is set to none, the power plan setting TOFF corresponding to the display power-off mode is set to none, the power plan setting TSLP corresponding to the information processor (computer) sleep mode is set to 25 minutes, and the power plan setting TSTP corresponding to the information processor (computer) hibernation mode is set to 50 minutes.

Based on the power plan setting TDIM, the power plan setting TOFF, the power plan setting TSLP, and the power plan setting TSTP acquired at S12, the MPU 11 identifies a power plan setting TMIN that is the power plan setting specified with the shortest time among these power plan settings, and calculates and sets a face detection interval time (S13).

More specifically, in the example illustrated in FIG. 3A, because the power plan setting TDIM corresponding to the display brightness reduction mode is specified with the shortest time, the MPU 11 sets TMIN to TDIM.

Similarly, in the example illustrated in FIG. 3B, because the power plan setting TSLP corresponding to the information processor sleep mode is specified with the shortest time, the MPU 11 sets TMIN to TSLP.

Figure 4:
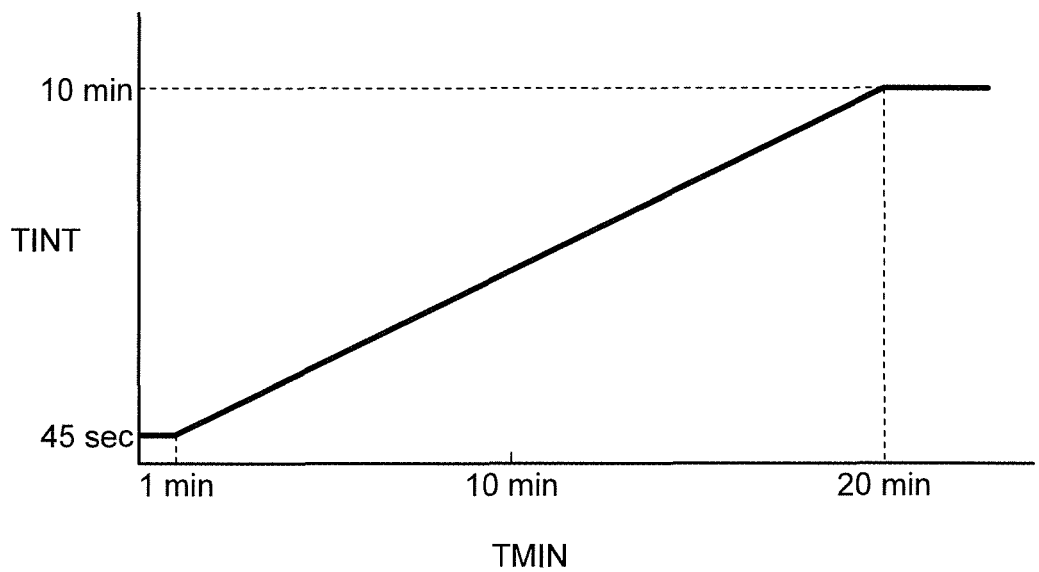
FIG. 4 is an exemplary schematic diagram for explaining a method of calculating a face detection interval in the embodiment.

FIG. 4 is a general schematic diagram for explaining a method of calculating the face detection interval.

The MPU 11 then determines to which one of equal to or less than 1 minute, more than 1 minute and less than 20 minutes, and equal to or more than 20 minutes the power plan setting specified with the shortest time belongs.

If the power plan setting specified with the shortest time is equal to or less than 1 minute, the MPU 11 sets the face detection interval time TINT to 45 seconds.

If the power plan setting specified with the shortest time TMIN is more than 1 minute and equal to or less than 20 minutes, the MPU 11 sets the face detection interval time TINT to TMIN/2 minutes.

If the power plan setting specified with the shortest time TMIN is more than 20 minutes, the MPU 11 sets the face detection interval time TINT to 10 minutes.

Therefore, in the example illustrated in FIG. 3A, because TMIN=TDIM=2 minutes, the face detection interval time TINT is set as: TINT=2/2=1 minute.

Similarly, in the example illustrated in FIG. 3B, because TMIN=TDIM=25 minutes, the face detection interval time TINT is set as: TINT=10 minutes.

The MPU 11 sets the face detection interval time TINT (=X) to a face detection interval timer (internal timer) used when the user is present, and causes the timer to start counting.

The MPU 11 then goes to a routine process including a user presence detection and a user authentication (S14).

Figure 5:
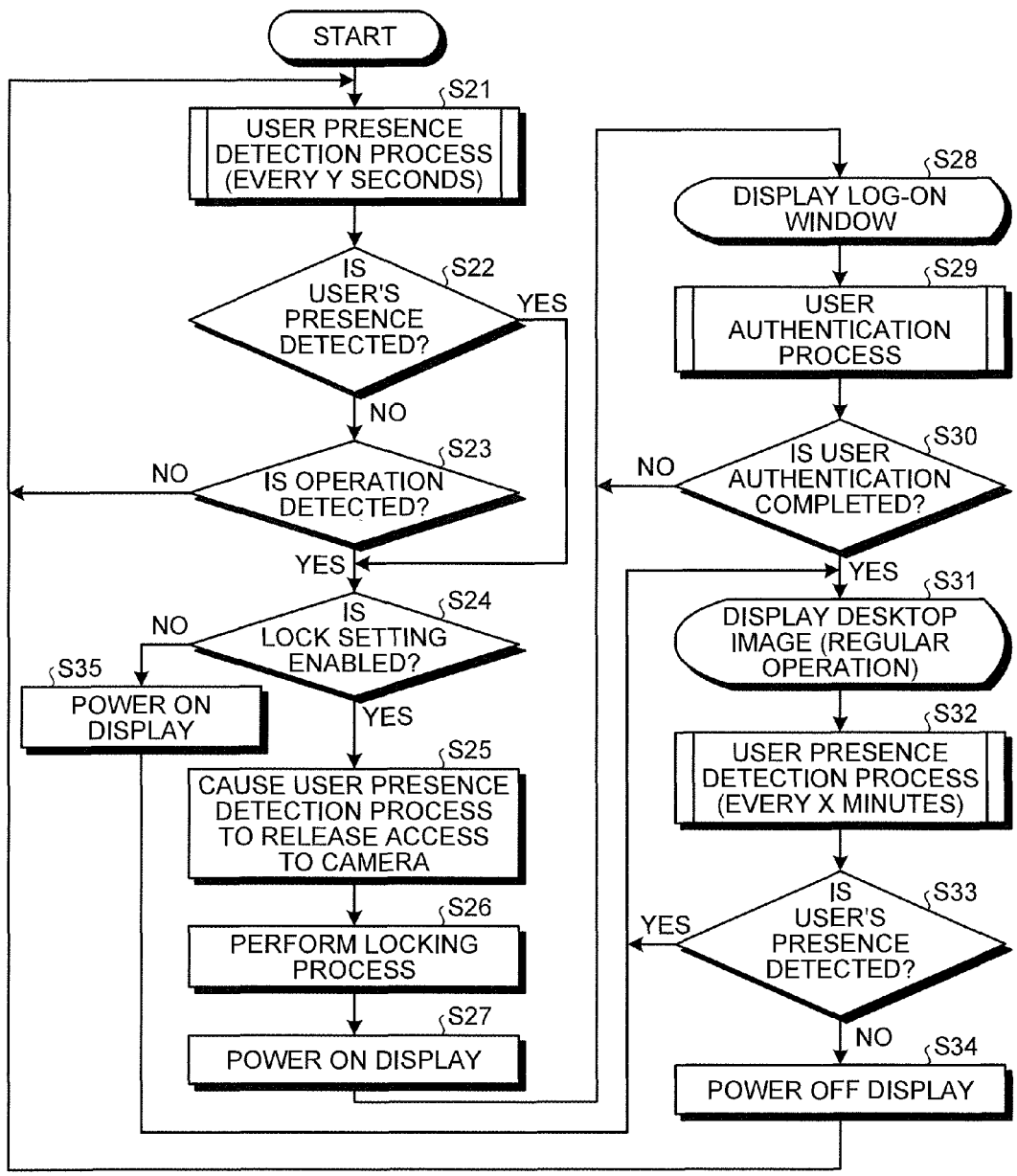
FIG. 5 is an exemplary flowchart of a routine process in the embodiment.

FIG. 5 is a flowchart of the regular process.

To begin with, the MPU 11 performs a user presence detection process at every Y seconds (S21). Y is time set to the face detection interval timer (internal timer) used when the user is absent, and specified with relatively short time to enable the presence of the user to be detected quickly. In this manner, the user is prevented from feeling anxious about the information processor 10 not starting to operate. Specifically, Y is specified with time of approximately 2 seconds.

When the face detection interval timer completes counting, in other words, in every two seconds in the example explained above, the MPU 11 powers on the camera 18 only for a time required for image capturing, and causes the camera 18 to capture the image. The MPU 11 then acquires the image thus captured, and powers off the camera 18 again. The MPU 11 then performs a face detection process, that is, the user presence detection process (S21).

The MPU 11 then determines if a face is detected, i.e., the presence of the user, in the face detection process at S21 (S22).

If no face is detected at the determination at S22, i.e., if the user is absent (No at S22), the MPU 11 determines if an operation on the operation device 19 by the user is detected (S23).

If no user operation on the operation device 19 is detected at the determination at S23 (No at S23), the MPU 11 returns the process to S21, and the same process is repeated thereafter.

If a user operation on the operation device 19 is detected in the determination at S23 (Yes at S23), the MPU 11 proceeds to the process to S24.

If a face is detected, in other words, if presence of the user is detected at the determination at S22 (Yes at S22), the MPU 11 determines if a lock setting requiring a user authentication is enabled in the information processor 10 (S24).

If it is determined that the lock setting is disabled at the determination at S24 (No at S24), the MPU 11 powers on the display 17 via the internal I/O 14 (S35), and proceeds to the process to S31.

Powering on the display 17 herein means to cause the display 17 to display an image effectively, and includes not only actually powering on the display, but also turning on the backlight, when the display 17 is a liquid crystal display using a backlight, for example (the same can be said for the explanation hereunder).

When it is determined that the lock setting is enabled at the determination at S24 (Yes at S24), because the user presence detection process (user presence process application) stops dominating the access to the camera 18, the MPU 11 releases the access to the camera 18 (a camera device) (S25).

The MPU 11 then performs a locking process so as to allow the user authentication process (user authentication application) to dominate access to the camera 18 (camera device) (S26).

The MPU 11 then powers on the display 17 (or keeps the power on of the display 17) via the internal I/O 14 (S27).

Figure 6:
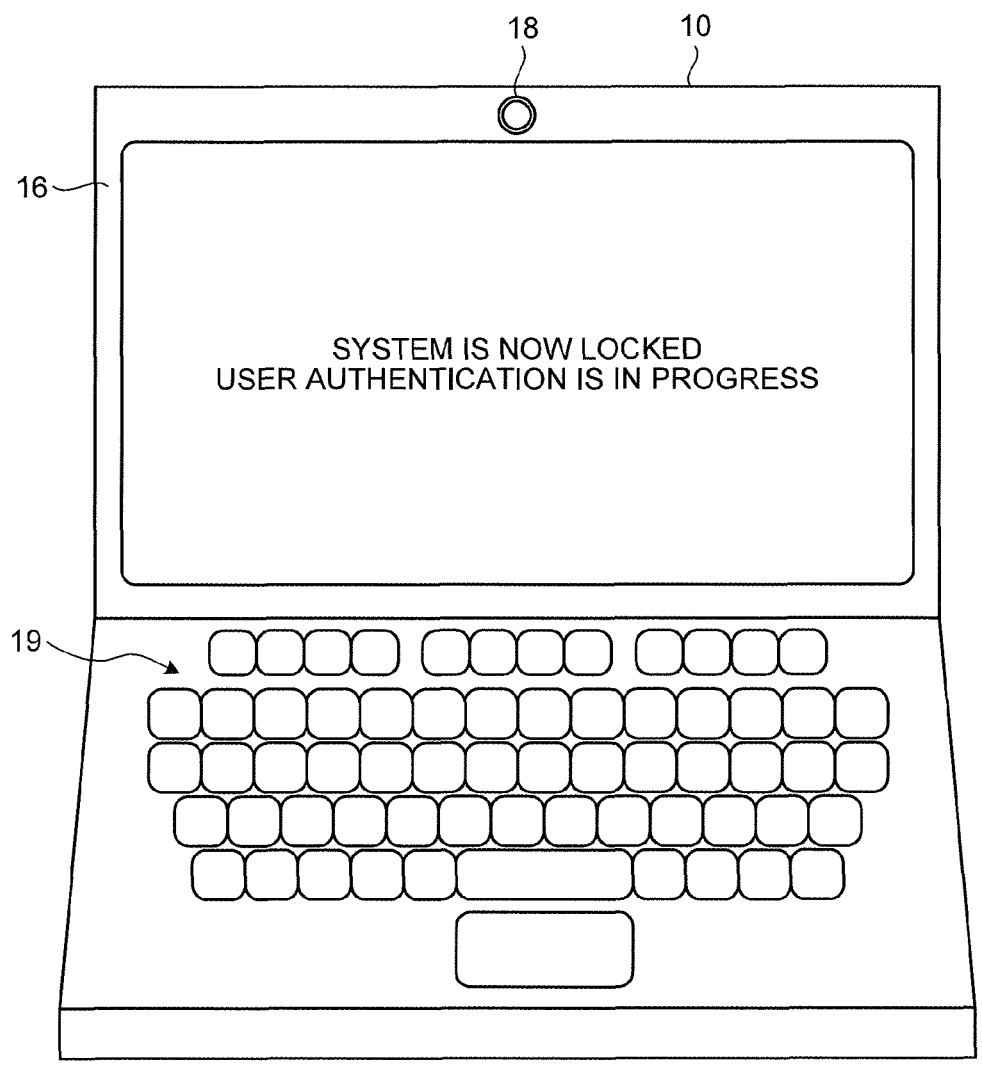
FIG. 6 is an exemplary schematic diagram for explaining how an exemplary log-on window (lock window) is displayed, in the embodiment.

FIG. 6 is a schematic diagram for explaining how an exemplary log-on window (lock window) is displayed (S28).

Once the display 17 is powered on, the MPU 11 displays a log-on window, such as the one illustrated in FIG. 6, onto the display screen of the display 17.

The MPU 11 then performs a user authentication process using the user authentication application (S29). Specifically, the MPU 11 captures an image by powering the camera 18 on only for a time required for the image capturing, acquires data thus captured, and powers off the camera 18 again. The MPU 11 then detects the face of the user from the image represented by the captured data, and performs an image recognition process, such as pattern matching, and determines if the face of the user thus detected corresponds to the face of an authorized user.

The MPU 11 then determines if the user authentication is completed in the user authentication process at S29, in other word, determines if the user authentication application was able to detect the face of an authorized user (S30).

If the user authentication application was not able to detect the face of the authorized user in the determination at S30 (No at S30), the MPU 11 determines that the user authentication is incomplete, and proceeds to the process to S28 again, and the same process is repeated thereafter.

If the user authentication application was able to detect the face of the authorized user in the determination at S30 (Yes at S30), the MPU 11 determines that the user authentication is completed, displays a desktop image on the display screen of the display 17, and causes the information processor 10 to perform a routine operation (S31).

The MPU 11 then sets the face detection interval time (X minutes) to the face detection interval timer (internal timer) for detecting the presence of the user, and causes the timer to start counting.

The MPU 11 determines if the face detection interval timer reaches the count (is counted up). When the face detection interval timer reaches the count, in other word, once in every X minutes, the MPU 11 captures an image by powering the camera 18 on only for a time required for the image capturing, acquires data thus captured, and powers off the camera 18 again.

The MPU 11 then performs the face detection process, that is, the user presence detection process (S32)

The MPU 11 then determines if the face is detected in the face detection process at S33, in other word, determines if the presence of the user is detected (S33).

If no face is detected, in other word, the presence of the user is not detected in the determination at S33 (No at S33), the MPU 11 powers off the display 17 via the internal I/O 14 (S34).

Powering off the display 17 herein means an off-state in which the display 17 stops displaying an image effectively, and includes not only actually powering off the display, but also turning off the backlight, when the display 17 is a liquid crystal display using a backlight, for example. In other words, powering off includes a situation where the display control is continued but no image is effectively displayed.

The MPU 11 then proceeds to the process to S21, and the same process is repeated thereafter.

If the face is detected in the determination at S33, in other word, the presence of the user is detected (Yes at S33), the MPU 11 returns the process to S31, and the same process is performed thereafter.

As explained above, according to the embodiment, immediately after the information processor 10 is powered on and when absence of the user is detected, the user presence detection process (user presence detection application) has an exclusive access to the camera 18 (camera device).

By contrast, once presence of the user is detected while the lock setting is enabled, in order to perform the user authentication, the user presence detection process (user presence detection application) is caused to release the access to the camera 18 (a camera device), and then the locking process, which is a prerequisite for a user authentication, is performed before powering on the display 17. Therefore, security can be ensured, without permitting the display 17 to display the desktop image used in the routine operation.

Furthermore, because the access to the camera 18 is released before the process proceeds to the user authentication process (user authentication application), the user authentication process (user authentication application) can reliably acquire and make use of the exclusive access to the camera 18. As a result, the user authentication process (user authentication application) can reliably perform the user authentication process using the camera 18, and therefore, usability of the user is improved.

Figure 7:
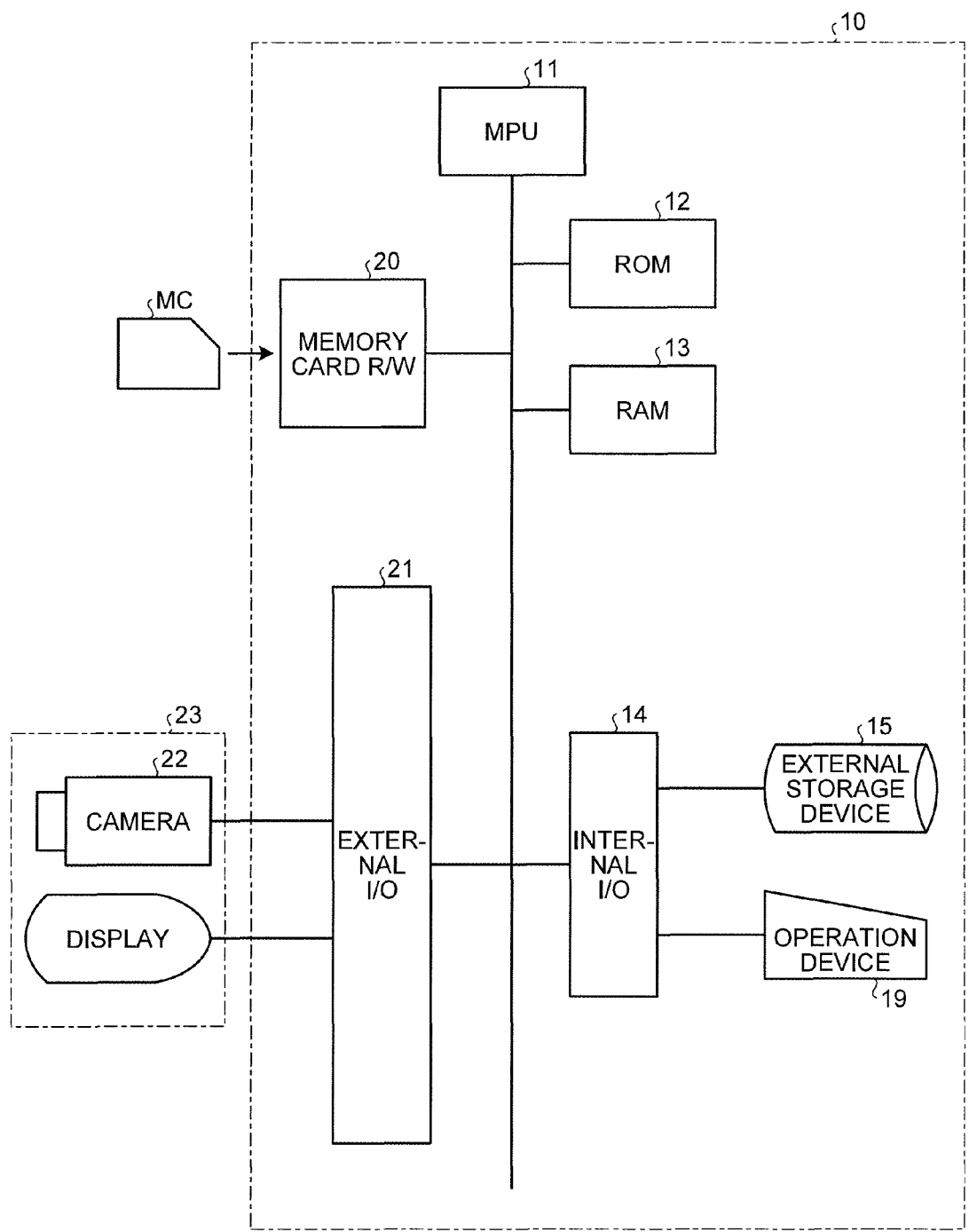
FIG. 7 is an exemplary block diagram of a configuration of an information processor according to a modification of the embodiment.

FIG. 7 is a block diagram of a general configuration of an information processor according to a modification of the embodiment.

Explained in the above embodiment is an example in which the information processor 10 is a laptop personal computer comprising an internal camera, and the display 17 and the camera 18 are integrally housed in the display panel 16 of the information processor 10. An information processor 10A according to the modification is configured as a desktop personal computer comprising an external input/output (I/O) module 21 for performing various interface operations with an external device, instead of the display panel 16 in which the display 17 and the camera 18 are integrally housed, and to which an external display 23 is connected via the external I/O 21. A camera 22 is then integrally housed in the external display 23.

In the modification of the embodiment having such a configuration as well, when the user presence detection process (user presence detection application) or the user authentication process (user authentication application) dominates the access to a single camera 18 that is externally connected, the access can be granted reliably as required. Reliably avoided thereby without sacrificing the usability of users is a deadlock leading to situations where neither one of the user presence detection process and the user authentication process can be performed.

Explained above is an example in which the electronic device is an information processor (computer), but the embodiment can be applied to any electronic device using a display, such as a television and a video recorder.

Explained above is an example in which the face detection interval timer is set only once as initial setting. However, it is also possible to set the face detection interval time shorter than the face detection interval time set at S13 when the user presence is no longer detected (No at S33) and the display is powered off (S34), until the user presence is detected again. Furthermore, it is also possible to keep performing the face detection successively, without setting the face detection interval time.

Furthermore, there are no explanations about when the power plan setting is updated, above. However, when the power plan setting is updated, the time set to the face detection interval timer is also updated. In this manner, the face detection interval timer is always set to be shorter than the shortest time to which the power plan setting is specified, and energy saving can be achieved reliably.

The control program executed on the electronic device according to the embodiment is provided in a manner incorporated in the ROM or the like in advance.

The control program executed on the electronic device according to the embodiment may also be provided in a manner recorded in a computer-readable recording medium, such as a compact disk read-only memory (CD-ROM), a flexible disk (FD), a compact disk recordable (CD-R), a digital versatile disk (DVD), and a memory card, as a file in an installable or executable format.

Furthermore, the control program executed on the electronic device according to the embodiment may be stored in a computer connected to a network such as the Internet, and may be made available for downloads over the network. Furthermore, the control program executed on the electronic device according to the embodiment may be provided or distributed over a network such as the Internet.

The control program executed on the electronic device according to the embodiment has a modular structure including each module explained above (a display controller, a user presence determination module, a reference elapsed time storage module, an interval time setting module, and a power controller). As actual hardware, for example, by causing a central processing unit (CPU) (processor) to read the computer program from the ROM and to execute the computer program, each of the display controller, the user presence determination module, the reference elapsed time storage module, the interval time setting module, and the power controller is loaded onto the main memory, and is generated on the main memory.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
a display configured to display various types of information; and
a hardware processor communicatively coupled to the display and a camera, wherein the hardware processor is configured to:
perform a user presence detection process to determine a presence of a user based on image data received from the camera while the user presence detection process is dominating access to the camera;
when the display is put in a screen lock state, perform a user authentication process based on the image data received from the camera while the user presence detection process is dominating access to the camera;
when the user is determined to be absent as a result of the user presence detection process performed while the user presence detection process is dominating access to the camera, turn off the display without putting the display in the screen lock state; and
when, after turning off the display, the user is determined to be present as a result of the user presence detection process performed while the user presence detection process is dominating access to the camera, release the access to the camera by the user presence detection process, and put the display in the screen lock state before turning on the display so that the user authentication process dominates access to the camera,
wherein the hardware processor is configured to put the display in the screen lock state when the screen lock setting is enabled in advance and the hardware processor is configured to determine the presence of the user at intervals of a predetermined time, while the display has not been put in the screen lock state.

2. The electronic device of claim 1, wherein the camera is configured to be embedded in the electronic device or to be externally connected to the electronic device.

3. The electronic device of claim 1, wherein the hardware processor is configured to authenticate the user by recognizing a face of the user.

4. The electronic device of claim 1, wherein the hardware processor is configured to determine the presence of the user by recognizing a face of the user.

5. An electronic device controlling method comprising:
displaying various types of information on a display;
performing a user presence detection process to determine a presence of a user based on image data received from a camera while the user presence detection process is dominating access to the camera;
when the display is put in a screen lock state, performing a user authentication process based on the image data received from the camera while the user presence detection process is dominating access to the camera;
when the user is determined to be absent as a result of the user presence detection process performed while the user presence detection process is dominating access to the camera, turning off the display without putting in the screen lock state; and
when, after turning off the display, the user is determined to be present as a result of the user presence detection process performed while the user presence detection process is dominating access to the camera, releasing the access to the camera, and putting the display in the screen lock state before turning on the display so that the user authentication process dominates access to the camera,
wherein the display is put in the screen lock state when the screen lock setting is enabled in advance, and the presence of the user is determined at intervals of a predetermined time, while the display has not been put in the screen lock state.

6. A computer program product having a non-transitory computer readable medium including programmed instructions, wherein the instructions, when executed by a computer, cause the computer to perform:
displaying various types of information on a display;
performing a user presence detection process to determine a presence of a user based on image data received from the camera while the user presence detection process is dominating access to the camera;
when the display is put in a screen lock state, performing a user authentication process based on the image data received from the camera while the user presence detection process is dominating access to the camera;
when the user is determined to be absent as a result of the user presence detection process performed while the user presence detection process is dominating access to the camera, turning off the display without putting the display in the screen lock state; and
when, after turning off the display, the user is determined to be present as a result of the user presence detection process performed while the user presence detection process is dominating access to the camera, releasing the access to the camera, and putting the display in the screen lock state before turning on the display so that the user authentication process dominates access to the camera,
wherein the computer is configured to put the display in the screen lock state when the screen lock setting is enabled in advance and the computer is configured to determine the presence of the user at intervals of a predetermined time, while the display has not been put in the screen lock state.

* * * * *